3,529,123
ELECTRON BEAM HEATING WITH CONTROLLED BEAM

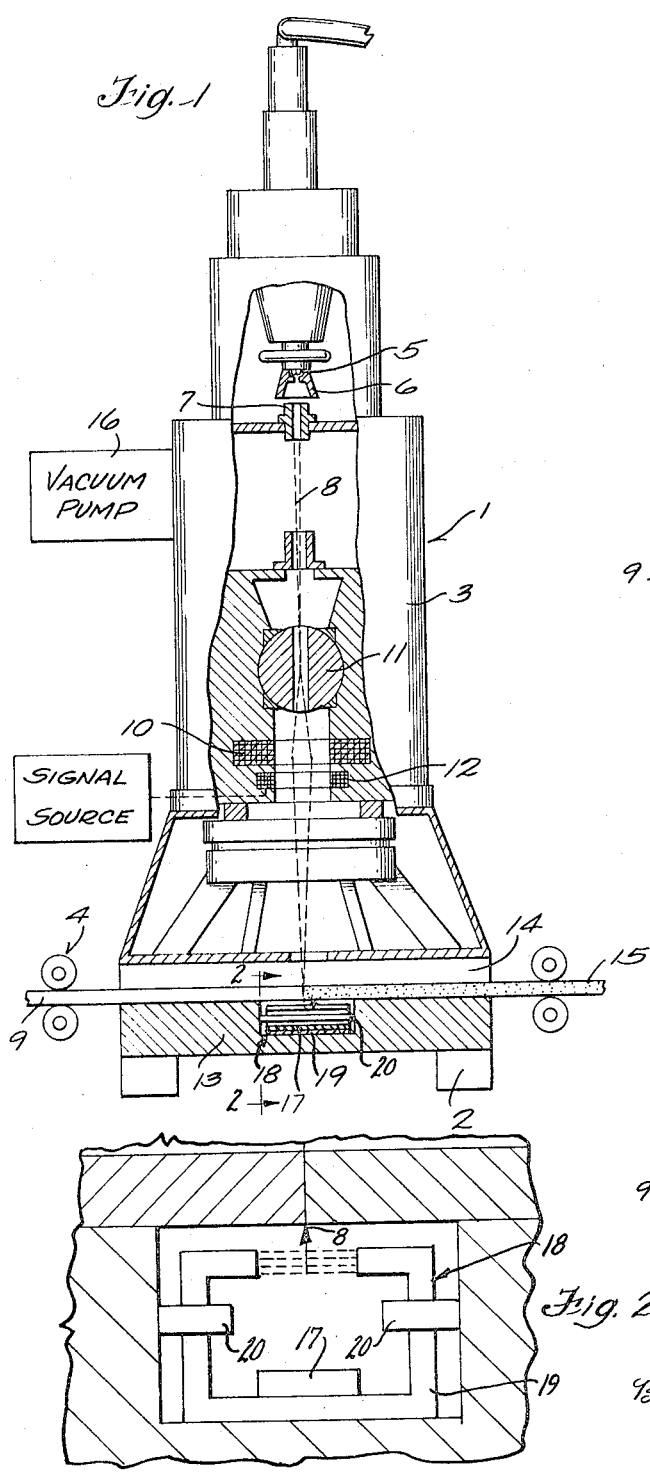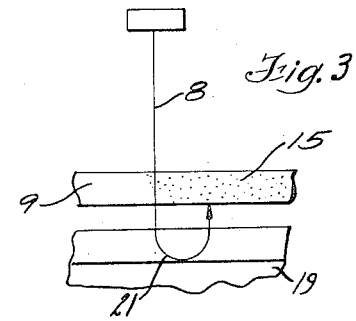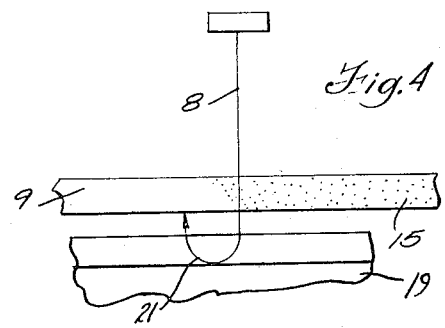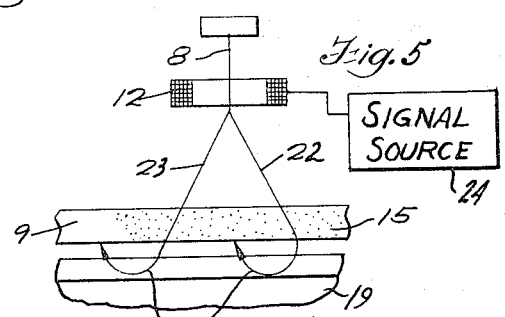

John F. Hinrichs, Menomonee Falls, Wis., assignor to A. O. Smith Corporation, Milwaukee, Wis., a corporation of New York
Filed July 24, 1968, Ser. No. 747,166
Int. Cl. B23k 15/00
U.S. Cl. 219—121                                    13 Claims

ABSTRACT OF THE DISCLOSURE

This disclosure relates to electron beam welding wherein a beam of electrons is focused on a weld line and directly effects a welding of a metal workpiece.

The emitted beam from the back side of the work or weld is deflected backwardly onto the weld line by a suitable magnetic field. The emitted beam may be deflected forwardly in front of the actual weld to preheat the work or rearwardly onto the weld to post heat the weld. The beam proper may be back and forth along the weld line to provide a multiple treatment or rewelding of the weld.

---

This invention relates to electron beam welding apparatus having means for controlling the beam after passage through the weld area to effect an actual welding.

Electron beam welding generally employs an electron beam gun which is adapted to establish a beam of electrons which is focused on a weld line and which directly effects a welding of the metal. A backup insert or strip may be provided to the backside of the weld area in order to eliminate destruction of the supporting work fixture and by proper selection of the material of the insert generate gases which improve the weld characteristic. Although such a system has been found to provide a highly improved method of welding which is particularly adapted to automated high speed welding, it does require replacement of the insert and the principle energy in the beam emitted from the back side of the work is generally lost.

The present invention is particularly directed to a beam control to improve the weld formed by electron beam welding.

Generally, in accordance with the present invention, the emitted beam from the back side of the work or weld is deflected backwardly onto the weld line. It can be deflected forwardly in front of the actual weldment to preheat of the work or rearwardly onto the weldment to post heat the weld. The beam can be readily controlled by a suitable permanent magnet, electromagnet or the like, to readily reversely deflect the beam for the preheat or post heat of the weld area.

The drawing furnished herewith illustrates a preferred construction of the present invention in which the above advantage and features are clearly disclosed, as well as others which will be readily understood by those skilled in the art from the following description.

In the drawing:

FIG. 1 is a side fragmentary of an electron beam welding apparatus.

FIG. 2 is an enlarged vertical section taken generally on line 2—2 of FIG. 1;

FIG. 3 is a diagrammatic illustration showing the beam deflection for post treatment or heating of the weld;

FIG. 4 is a diagrammatic illustration showing beam deflection for pretreating of the work along the weld line; and FIG. 5 is a view similar to FIG. 3 illustrating a further modification of the present invention.

Referring to the drawings and particularly to FIG. 1, assembly 1 is disposed on a support 2, and is provided with a vacuum enclosure 3. The illustrated apparatus is similar to that disclosed in applicant's copending application entitled Electron Beam Welding of Rimmed Carbon Steel, filed on Jan. 6, 1967 with Ser. No. 607,826. A workpiece loading assembly 4 is provided to position the workpiece in relation to the electron beam gun assembly 1. The electron beam gun assembly 1 is generally similar to that shown in the Steigerwald Pat. 2,987,610.

The beam gun assembly 1 includes an emitter cathode filament 5, a bias cup 6 for initially focusing the electron beam, and controlling beam current. A grounded anode 7 is provided to accelerate an electron beam 8. An accelerating potential of approximately 10,000 v. to 150,000 v. is provided during actual welding to direct the electron beam 8 down through the vacuum enclosure 3 and against a workpiece 9. Focusing of the beam 8 is accomplished by means of a magnetic coil 10 which is disposed between the workpiece 9 and the anode 7. A valve 11 is provided near the bottom of the vacuum enclosure 3. The valve 11 is adapted to remain closed at all times when actual welding is not underway to protect the cathode filament 5 from oxidation of the air. In addition, deflection of the beam 8 along the weld line may be accomplished by means of a deflection coil 12 which is provided to direct the beam 8 along a desired welding path or line. The illustrated workpiece may be a pair of plates adapted to be moved through chamber 14 with the seam aligned with beam 8 for joining of the edges as at 15. The electron beam gun assembly 1 is disposed to the top side of a welding housing and fixture 13 which includes a welding chamber 14. The workpiece 9 may be manually or automatically loaded to fixture 13 and passed through the welding chamber 14 which is connected with and extends downwardly from the vacuum enclosure 3.

In the illustrated embodiment, a vacuum pumping assembly 16 is connected to the vacuum enclosure 3 to establish the necessary low vacuum generally of the order of .1 micron. A separate vacuum pumping assembly, not shown, may be included to pump down the welding chamber 14 to a lesser vacuum (10–100 microns) for welding as disclosed in the previously identified copending application or the welding may be accomplished in a normal atmospheric condition.

In the illustrated embodiment of the present invention, the welding fixture 13 and particularly the welding chamber 14 includes a backup insert 17 of aluminum or the like within the chamber 14 in alignment with the electron beam 8 and the weld line. An electromagnetic deflecting coil unit 18 or other suitable electron beam deflection control is provided within the fixture between the back side of the work 9 and the insert 17. In the illustrated embodiment of the invention, unit 18 includes a generally rectangular magnetic core 19 with a top opening into which the beam 8 extends. Suitable coils 20 are secured to the opposite legs of the core to create a field across the opening the core. The magnetic field of the electromagnetic deflection coil unit 18 extends in a plane normal to the beam 8 and parallel to the weld line and interacts with the magnetic field of the beam 8 to deflect the beam as at 21 through 180 degrees in the vertical plane.

Referring particularly to FIG. 3, the field of coil unit 18 is directed to deflect the emitted beam backwardly onto the immediately preceding completed weld 15. In this manner, there is a continuous post heating of the weld 15 with an improvement in the weld. Thus, in electron beam welding, the shrinkage in the weld area results from the melting and resolidifying of the parent metal. A single pass normally results in an undercut in the weld and an additional smoothing pass may be necessary or made. The bent beam of the present invention may produce a smoothing pass with the initial welding pass. In a continuous weld, the final or terminal portion of the weld 15, where the beam 8 has moved past the workpiece, will not be treated or special means provided to modify the beam 8 to compensate for the fact that the beam does dissipate any of its energy in effecting an actual weld.

As shown in FIG. 4, the beam 8 may also be deflected backwardly in the opposite direction such that the emitted electron beam passing through the weld 15 is deflected forwardly of the weld 15 onto the work 9 and particularly along the weld line to preheat the workpiece and/or establish an actual welding. As a result, the actual heat required of the principal portion of the electron beam 8 to create or complete the weld 15 is reduced. This will permit the welding speed to be increased.

Further, in accordance with another aspect of the present invention, the beam 8, as such, may be deflected back and forth along the line of the weld between a leading position 22 and a trailing position 23, as shown in FIG. 5. Thus, a square wave deflection signal source 24 of an alternating character may be applied to the coil 12 and the beam 8 will appear as a split beam visually including position 22 and 23. Further, the amplitude and time of the half cycles may be controlled to determine the timed position of the beam 8 and the bent beam portion 19 with respect to the weld 15.

The continuous or stepped movement of beam 8 and the bent beam portion 19 produces a multiple pass effect in a single pass and thus produces the advantages known to result from the concept of reweld of metal with an electron beam process. Generally, the establishment of at least partial vacuum in the welding chamber 14 would appear to produce the smoothest weld in accordance with the theory of vacuum rewelding of electron beam formed welds.

The present invention provides a simple means to improve the weld characteristic and the speed of electron beam welding.

Various modes of carrying out the invention are contemplated as being within the scope of the following claims particularly pointing out and distinctly claiming the subject matter which is regarded as the invention.

I claim:

1. An electron beam heating apparatus for heating of a workpiece means comprising a beam source to establish an electron beam passing through a workpiece supporting area to pass through said workpiece means and establish a weld, and deflection means mounted to the beam exit side of said workpiece in the path of the beam and deflecting the beam backwardly and laterally to one side of said beam into engagement with said weld.

2. The heating apparatus of claim 1, having a second deflection means mounted between said first deflection means said beam source and above the supporting area in the path of the beam to deflect said beam along a weld line, said second deflection means being spaced to permit placement of a workpiece therebetween, and said first deflection means deflecting said beam onto said weld line.

3. The heating apparatus of claim 1 including means establishing relative movement between said workpiece and said electron beam along a selected weld line to progressively generate a weld, and said deflection means deflects said beam to the trailing side of said workpiece and upon said completed weld.

4. The apparatus of claim 1 including means establishing relative movement between said workpiece and said electron beam along a selected weld line to progressively generate the weld, and said deflection means deflects said beam to the leading side of said weld and along the line of relative movement to preheat the workpiece on said weld line.

5. The electron beam apparatus of claim 1 wherein said deflection means includes a magnetic field forming means establishing a magnetic field extending across the path of the beam.

6. The electron beam apparatus of claim 1 wherein said deflection means includes an electromagnetic means establishing a magnetic field in a plane essentially normal to said beam.

7. The apparatus of claim 1 wherein said electron beam is essentially fixed and a moveable support for the workpiece to move said workiece past said beam along a selected weld line to progressively generate a weld, and said deflection means is mounted to the backside of said workpiece and deflects said beam back upon said weld line.

8. The heating apparatus of claim 1, having a second deflection means mounted between sad first deflection means and said beam source and above said supporting area in the path of the beam to establish a pair of angularly spaced positions of said beam along a heat line, said first and second deflection means being spaced to opposite sides of the supporting area for placement of a workpiece therebetween, and said first deflection means deflecting said beam onto said heat line.

9. The heating apparatus of claim 1, wherein said apparatus includes means establishing a weld of a metal workpiece by relative movement between said workpiece and said electron beam along a selected weld line to progressively generate a weld, and second deflection means disposed between the beam source and the workpiece deflects said beam along the weld line, and signal means connected to said deflection means establishes a pair of angularly spaced positions of said beam along a heat line.

10. The heating apparatus of claim 1, wherein said apparatus means establishing a weld of a metal workpiece by relative movement between said workpiece and said electron beam along a selected weld line to progressively generate a weld, and second deflection means disposed between the beam source and the workpiece deflects said beam along a weld line, said second deflection means being an electromagnetic coil unit, and a square wave signal source having alternate half cycles of opposite polarities connected to said electromagnetic coil unit.

11. The heating apparatus of claim 1, wherein said apparatus includes means establishing movement between said workpiece and said electron beam along a selected weld line to progressively generate a weld, and said deflection means includes a magnetic core having an opening into which the beam projects and coil means on the core establishing a magnetic field across said opening, said magnetic field deflecting said beam backwardly and laterally onto the underside of said weld line.

12. In the method of electron beam welding including the steps of progressively passing an electron beam through a metal member and establishing a metal fusion along a given weld line and reverse bending said beam onto the back side of the metal member along said given weld line.

13. The method of electron beam welding defined in claim 12 including the step of alternately positioning said electron beam between two relative positions along said given weld.

References Cited

UNITED STATES PATENTS

| | | | |
|---|---|---|---|
| 2,987,610 | 6/1961 | Steigerwald | 219—121 |
| 3,134,892 | 5/1964 | Opitz et al. | 219—121 |
| 3,151,231 | 9/1964 | Steigerwald | 219—121 |
| 3,178,804 | 4/1965 | Ullery et al. | 219—121 |
| 3,351,731 | 11/1967 | Tanaka | 219—121 |
| 3,417,224 | 12/1968 | Steigerwald et al. | 219—121 |

WILLIAM DEXTER BROOKS, Primary Examiner